United States Patent
Lin et al.

(10) Patent No.: US 10,756,639 B2
(45) Date of Patent: Aug. 25, 2020

(54) SECONDARY CONTROLLER APPLIED TO A SECONDARY SIDE OF A POWER CONVERTER AND OPERATION METHOD THEREOF

(71) Applicant: Leadtrend Technology Corp., Hsinchu County (TW)

(72) Inventors: Chung-Wei Lin, Hsinchu County (TW); Hung-Ching Lee, Hsinchu County (TW)

(73) Assignee: Leadtrend Technology Corp., Hsinchu County (TW)

( * ) Notice: Subject to any disclaimer, the term of this patent is extended or adjusted under 35 U.S.C. 154(b) by 0 days.

(21) Appl. No.: 16/506,962

(22) Filed: Jul. 9, 2019

(65) Prior Publication Data
US 2020/0136519 A1 Apr. 30, 2020

(30) Foreign Application Priority Data
Oct. 31, 2018 (TW) .............................. 107138511 A (51) Int. Cl.
*H02M 3/335* (2006.01)

(52) U.S. Cl.
CPC ... *H02M 3/33592* (2013.01); *H02M 3/33523* (2013.01)

(58) Field of Classification Search
CPC .................. H02M 3/33592; H02M 2001/0032
See application file for complete search history.

(56) References Cited

U.S. PATENT DOCUMENTS

| | | | | |
|---|---|---|---|---|
| 5,528,482 A | * | 6/1996 | Rozman | H02M 3/33569 327/309 |
| 6,822,882 B1 | * | 11/2004 | Jacobs | H02M 3/33592 363/21.06 |
| 6,961,253 B1 | * | 11/2005 | Cohen | H02M 1/08 363/89 |
| 8,854,842 B2 | | 10/2014 | Zheng | |
| 10,516,340 B1 | * | 12/2019 | Malinin | H02M 1/083 |

(Continued)

FOREIGN PATENT DOCUMENTS

| | | |
|---|---|---|
| EP | 2717450 A1 | 4/2014 |
| EP | 2916445 A1 | 9/2015 |

(Continued)

*Primary Examiner* — Fred E Finch, III
*Assistant Examiner* — Rafael O. De León Domenech
(74) *Attorney, Agent, or Firm* — Winston Hsu (57) ABSTRACT

A secondary controller applied to a secondary side of a power converter includes a control signal generation circuit, a voltage detection signal generation circuit, and a gate control signal generation circuit. The control signal generation circuit generates a short-circuited control signal to a short winding switch after a gate control signal to make the short winding switch be turned on. When an output voltage of the power converter is less than a predetermined voltage, the voltage detection signal generation circuit generates a first detection signal to the control signal generation circuit. The control signal generation circuit further generates a gate pulse control signal according to the first detection signal. The gate control signal generation circuit generates a gate pulse signal according to the gate pulse control signal, wherein the gate pulse signal is used for making a primary side of the power converter be turned on.

20 Claims, 5 Drawing Sheets

(56) References Cited

U.S. PATENT DOCUMENTS

| | | | |
|---|---|---|---|
| 2009/0086512 A1* | 4/2009 | Fahlenkamp | H02M 3/33592 363/21.06 |
| 2015/0015071 A1* | 1/2015 | Deboy | H02M 3/33592 307/31 |
| 2016/0094137 A1* | 3/2016 | Jitaru | H02M 3/3353 363/21.03 |
| 2017/0346411 A1 | 11/2017 | Yao | |
| 2017/0366044 A1* | 12/2017 | Tao | H02M 3/33523 |
| 2018/0269797 A1 | 9/2018 | Vemuri | |
| 2018/0301976 A1* | 10/2018 | Peng | H02M 7/219 |

FOREIGN PATENT DOCUMENTS

| | | |
|---|---|---|
| TW | 201429133 A | 7/2014 |
| WO | 2018/132761 A1 | 7/2018 |

\* cited by examiner

SECONDARY CONTROLLER APPLIED TO A SECONDARY SIDE OF A POWER CONVERTER AND OPERATION METHOD THEREOF

BACKGROUND OF THE INVENTION

1. Field of the Invention

The present invention relates to a secondary controller applied to a secondary side of a power converter and an operation method thereof, and particularly to the secondary controller and the operation method thereof that can utilize a short winding switch to make the power converter has lower cost and faster dynamic response to variety of an output voltage of the power converter when the power converter operates in a discrete current mode (DCM) or a quasi-resonant mode.

2. Description of the Prior Art

In the prior art, a designer of a power converter can utilize a primary controller applied to a primary side of the power converter, or utilize a secondary controller applied to a secondary side of the power converter to control turning-on and turning-off of the power converter. The primary controller utilizes an auxiliary winding of the primary side of the power converter to detect variety of an output voltage of the secondary side of the power converter to control turning-on and turning-off of the power converter. The secondary controller directly detects the variety of the output voltage of the secondary side, and transmits the variety of the output voltage to the primary controller through a feedback path formed by an optical coupler and a programmable shunt regulator (e.g. TL431) to control turning-on and turning-off of the power converter. Because the primary controller utilizes an indirect method to detect the variety of the output voltage (that is, the primary controller detects the variety of the output voltage through the auxiliary winding), compared to the secondary controller, the primary controller cannot accurately control turning-on and turning-off of the power converter. In addition, because the secondary controller controls turning-on and turning-off of the power converter through the feedback path formed by the optical coupler and the programmable shunt regulator, the power converter has problems of higher cost (because cost of the power converter includes cost of the optical coupler and the programmable shunt regulator) and slower dynamic response to the variety of the output voltage. Therefore, the above mentioned solutions provided by the prior art are not good choices for the designer of the power converter.

SUMMARY OF THE INVENTION

An embodiment of the present invention provides a secondary controller applied to a secondary side of a power converter. The secondary controller includes a control signal generation circuit, a voltage detection signal generation circuit, and a gate control signal generation circuit. The control signal generation circuit is used for generating a short-circuited control signal to a short winding switch after a gate control signal to make the short winding switch be turned on according to the short-circuited control signal. The voltage detection signal generation circuit is coupled to an output terminal of the secondary side of the power converter and the control signal generation circuit for generating a first detection signal to the control signal generation circuit when an output voltage of the power converter is less than a predetermined voltage, wherein the control signal generation circuit further generates a gate pulse control signal according to the first detection signal. The gate control signal generation circuit is coupled to the control signal generation circuit for generating a gate pulse signal according to the gate pulse control signal, wherein the gate pulse signal is used for making a primary side of the power converter be turned on.

Another embodiment of the present invention provides an operation method of a secondary controller applied to secondary side of a power converter, the secondary controller includes a control signal generation circuit, a voltage detection signal generation circuit, and a gate control signal generation circuit. The operation method includes the control signal generation circuit generating a short-circuited control signal to a short winding switch to make the short winding switch be turned on according to the short-circuited control signal after a gate control signal; the voltage detection signal generation circuit generating a first detection signal to the control signal generation circuit when an output voltage of the power converter is less than a predetermined voltage; the control signal generation circuit generating a gate pulse control signal according to the first detection signal; and the gate control signal generation circuit generating a gate pulse signal according to the gate pulse control signal, wherein the gate pulse signal is used for making a primary side of the power converter be turned on.

The present invention provides a secondary controller applied to a secondary side of a power converter and an operation method thereof. The secondary controller and the operation method utilize a short winding switch of the secondary side to make a secondary-side voltage of the secondary side not generate resonances to ensure that a the primary side of the power converter is turned off, and utilize a gate pulse signal responding to variety of an output voltage of the secondary side to make the primary side of the power converter be turned on. Therefore, compared to the prior art, because the secondary controller can control turning-on and turning-off of the power converter not necessarily through a feedback path formed by an optical coupler and a programmable shunt regulator, the power converter of the present invention has lower cost and faster dynamic response to the variety of the output voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
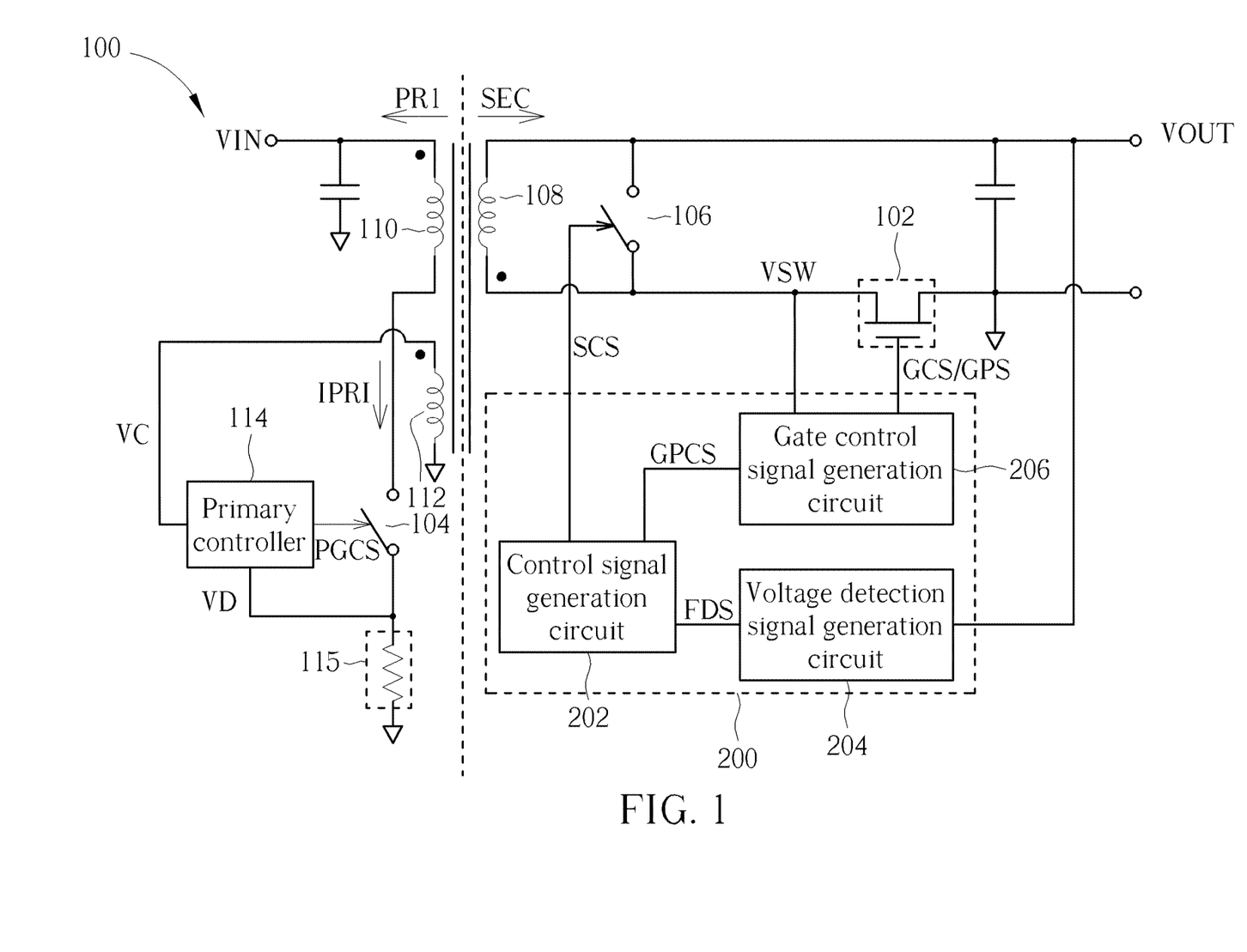
FIG. 1 is a diagram illustrating a secondary controller applied to a secondary side of a power converter according to a first embodiment of the present invention.
Figure 2:
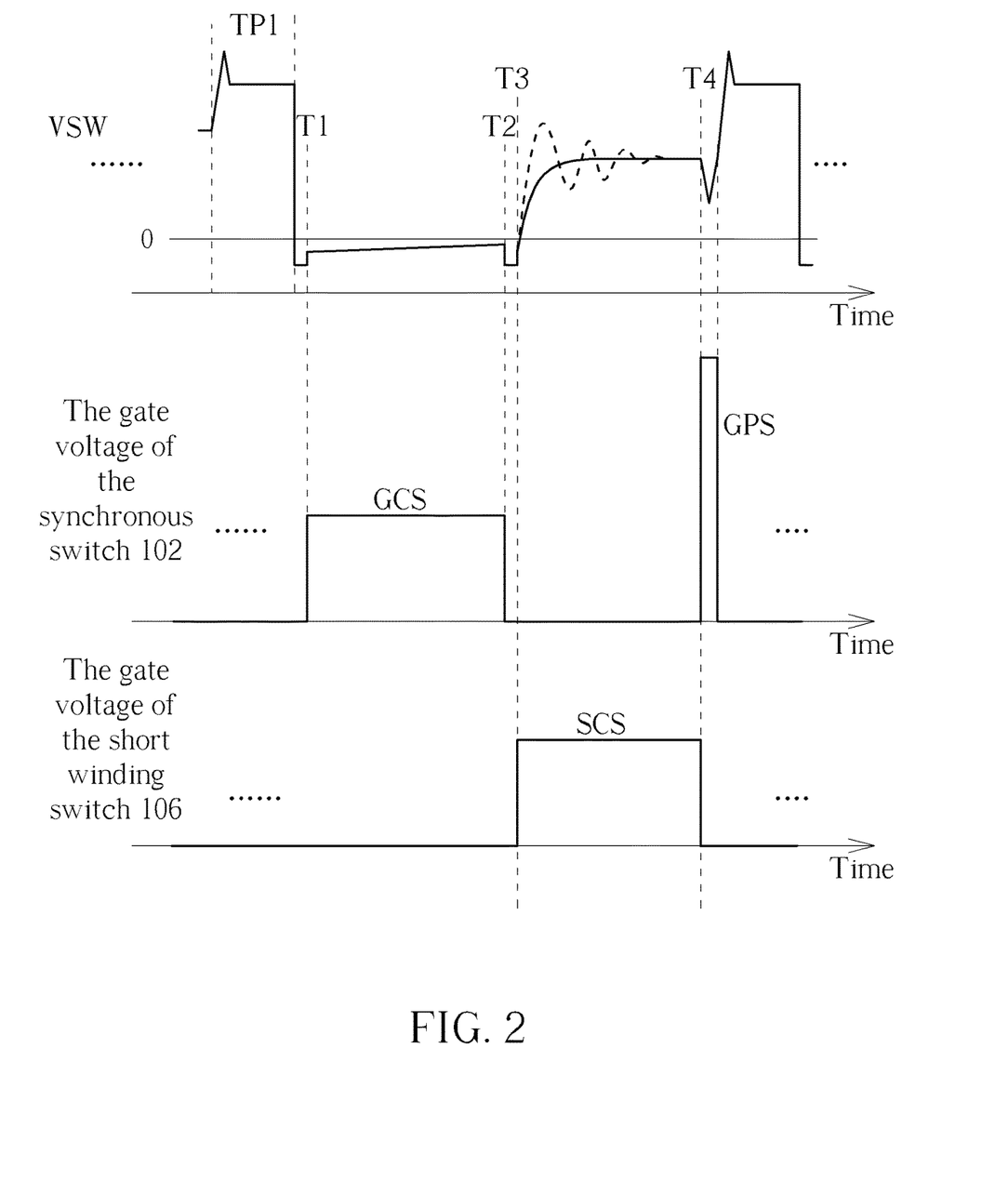
FIG. 2 is a timing diagram illustrating the secondary-side voltage of the secondary side of the power converter, the gate voltage of the synchronous switch, and the gate voltage of the short winding switch.

Please refer to FIG. 1. FIG. 1 is a diagram illustrating a secondary controller 200 applied to a secondary side SEC of a power converter 100 according to a first embodiment of the present invention, wherein the secondary controller 200 is located at the secondary side SEC of the power converter 100, the secondary controller 200 is applied to a discrete current mode (DCM) and a quasi-resonant mode of the power converter 100, the power converter 100 is a flyback power converter), and the secondary controller 200 includes a control signal generation circuit 202, a voltage detection signal generation circuit 204, and a gate control signal generation circuit 206. In addition, potential of ground of a primary side PRI of the power converter 100 is equal to or different from potential of ground of the secondary side SEC of the power converter 100. As shown in FIG. 1, the voltage detection signal generation circuit 204 is coupled to an output terminal of the secondary side SEC of the power converter 100 and the control signal generation circuit 202, and the gate control signal generation circuit 206 is coupled to the control signal generation circuit 202. Further, please refer to FIG. 2. A secondary-side voltage VSW (that is, a source voltage of a synchronous switch 102 of the secondary side SEC of the power converter 100) of the secondary side SEC of the power converter 100 is changed with turning-on of a power switch 104 of the primary side PRI of the power converter 100 during a time interval TP1. As shown in FIG. 2, after the time interval TP1 (that is, turning-on of the secondary side SEC of the power converter 100), the gate control signal generation circuit 206 can generate a gate control signal GCS according to the secondary-side voltage VSW between a time T1 and a time T2, wherein between the time T1 and the time T2 (that is, enabling time of the gate control signal GCS), the synchronous switch 102 can be turned on according to the gate control signal GCS, and the enabling time of the gate control signal GCS corresponds to a discharge time of the secondary side SEC of the power converter 100. In addition, as shown in FIG. 1, an alternating voltage is rectified by a bridge rectifier to generate an input voltage VIN of the primary side PRI of the power converter 100.

After the gate control signal GCS, the control signal generation circuit 202 can know that the gate control signal GCS is completed through the gate control signal generation circuit 206, so the control signal generation circuit 202 generates a short-circuited control signal SCS to a short winding switch 106 at a time T3 to make the short winding switch 106 be turned on according to the short-circuited control signal SCS, wherein the short winding switch 106 is coupled to a secondary-side winding 108 of the power converter 100, a predetermined time exists between the gate control signal GCS and the short-circuited control signal SCS, and the predetermined time is changed with a requirement of a designer of the power converter 100. If the short winding switch 106 does not exist, the secondary-side voltage VSW will have resonances (a dotted line after the time T3) generated by resonant influence of a primary-side winding 110 and the secondary-side winding 108 of the power converter 100. Therefore, as shown in FIG. 2, after the short winding switch 106 is turned on, the secondary-side voltage VSW does not have resonances to ensure that the primary side PRI of the power converter 100 is turned off.

As shown in FIGS. 1, 2, at a time T4, because an output voltage VOUT of the power converter 100 is less than a predetermined voltage (that is, a load coupled to the secondary side SEC of the power converter 100 is suddenly heavier), the voltage detection signal generation circuit 204 will generate a first detection signal FDS to the control signal generation circuit 202, wherein the control signal generation circuit 202 can generate a gate pulse control signal GPCS (shown in FIG. 1) to the gate control signal generation circuit 206 according to the first detection signal FDS, and also turns off the short-circuited control signal SCS according to the first detection signal FDS. Therefore, the gate control signal generation circuit 206 can generate a gate pulse signal GPS according to the gate pulse control signal GPCS. Therefore, the synchronous switch 102 of the secondary side SEC of the power converter 100 can be turned on according to the gate pulse signal GPS again. In addition, during enabling time of the gate pulse signal GPS, variety of the secondary-side voltage VSW due to turning-on of the synchronous switch 102 is coupled to the primary side PRI of the power converter 100 through a primary-side auxiliary winding 112 and the secondary-side winding 108 of the power converter 100, wherein when a voltage VC generated by the variety of the secondary-side voltage VSW is greater than a reference voltage, a primary controller 114 can generate a primary-side gate control signal PGCS to the power switch 104 accordingly, resulting in the primary side PRI of the power converter 100 being turned on. After the primary side PRI of the power converter 100 is turned on, the primary controller 114 can determine whether to turn off the primary side PRI of the power converter 100 according to a detection voltage VD, wherein the detection voltage VD is determined by a primary-side current IPRI flowing through the primary side PRI of the power converter 100 and a resistor 115.

In one embodiment of the present invention, during start-up of the power converter 100, because the secondary side SEC of the power converter 100 is not turned on yet, when the voltage VC of the primary side PRI of the power converter 100 is greater than a predetermined reference voltage, the primary controller 114 can generate the primary-side gate control signal PGCS to the power switch 104 to make the primary side PRI of the power converter 100 be turned on, wherein the predetermined reference voltage is lower than the reference voltage. However, in another embodiment of the present invention, when a slope of the voltage VC generated by the variety of the secondary-side voltage VSW is greater than a reference value, the primary controller 114 can generate the primary-side gate control signal PGCS to the power switch 104 accordingly, resulting in the primary side PRI of the power converter 100 being turned on. Therefore, as shown in FIG. 2, the secondary controller 200 can precisely implement to control turning-on and turning-off of the power converter 100 from the secondary side SEC of the power converter 100 through the short winding switch 106 and the gate pulse signal GPS. That is to say, the secondary controller 200 can implement to control turning-on and turning-off of the power converter 100 from the secondary side SEC of the power converter 100, not necessarily through a feedback path formed by an optical coupler and a programmable shunt regulator (e.g. TL431) disclosed by the prior art.

Figure 3:
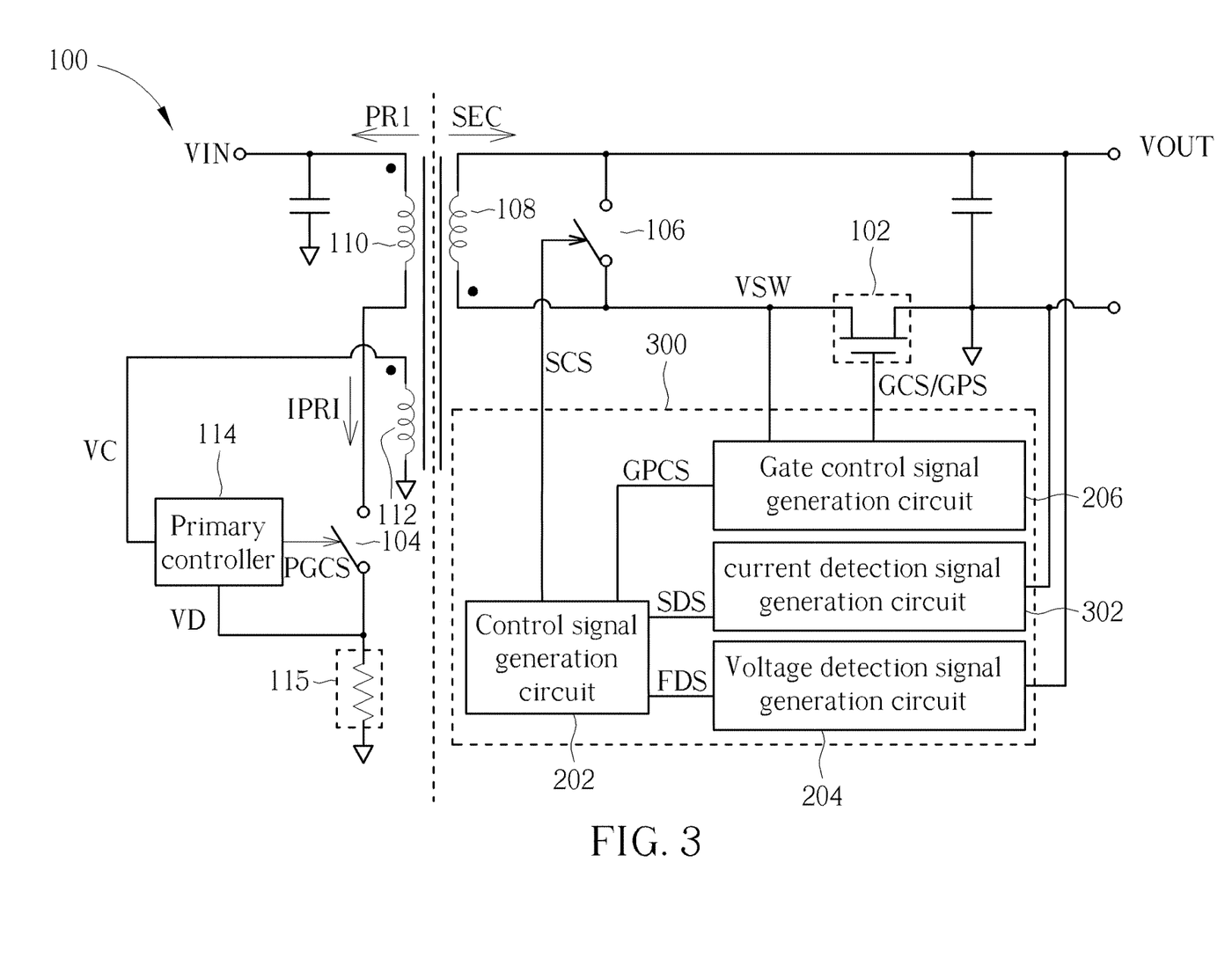
FIG. 3 is a diagram illustrating a secondary controller applied to the secondary side of the power converter according to a second embodiment of the present invention.

Please refer to FIG. 3. FIG. 3 is a diagram illustrating a secondary controller 300 applied to the secondary side SEC of the power converter 100 according to a second embodiment of the present invention. As shown in FIG. 3, a difference between the secondary controller 300 and the secondary controller 200 is that the secondary controller 300 further includes a current detection signal generation circuit 302, wherein when an output current IOUT of the power converter 100 is greater than a predetermined current (that is, the load coupled to the secondary side SEC of the power converter 100 is suddenly heavier), the current detection signal generation circuit 302 generates a second detection signal SDS to the control signal generation circuit 202, wherein the control signal generation circuit 202 can generate the gate pulse control signal GPCS according to one of the first detection signal FDS and the second detection signal SDS. In addition, subsequent operational principles of the secondary controller 300 are the same as those of the secondary controller 200, so further description thereof is omitted for simplicity.

In addition, in another embodiment of the present invention, a secondary controller applied to the power converter 100 only includes the current detection signal generation circuit 302, not including the voltage detection signal generation circuit 204, wherein operational principles of the secondary controller applied to the power converter 100 can be referred to those of the secondary controller 200, so further description thereof is omitted for simplicity.

Figure 4:
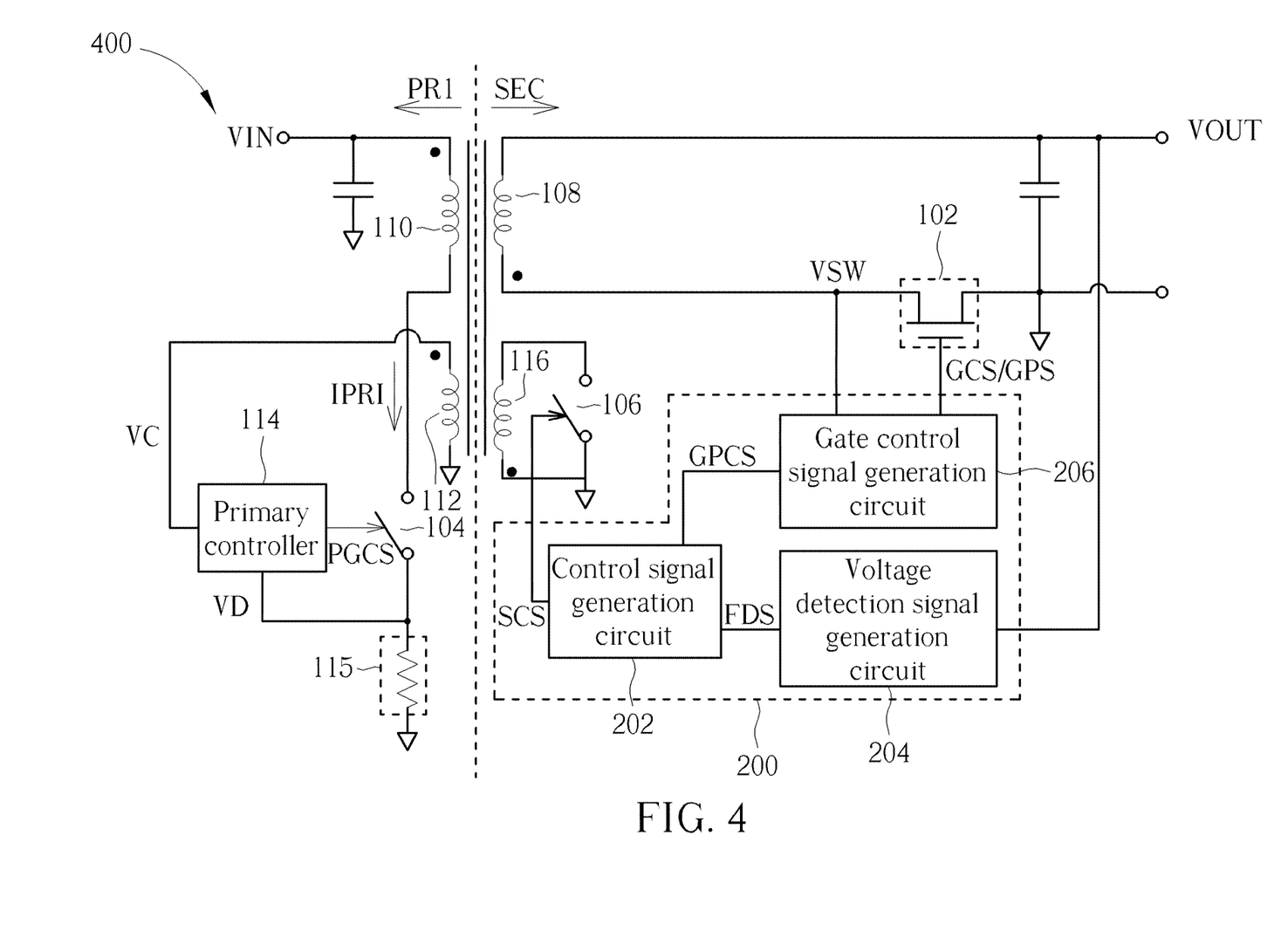
FIG. 4 is a diagram illustrating a power converter according to a third embodiment of the present invention.

Please refer to FIG. 4. FIG. 4 is a diagram illustrating a power converter 400 according to a third embodiment of the present invention, wherein the secondary controller 200 is applied to the power converter 400. As shown in FIG. 4, a difference between the power converter 400 and the power converter 100 is that the short winding switch 106 of the power converter 400 is coupled to a secondary-side auxiliary winding 116 of the power converter 400. Therefore, as shown in FIG. 4, during the enabling time of the gate pulse signal GPS, the variety of the secondary-side voltage VSW due to turning-on of the synchronous switch 102 is coupled to the primary side PRI of the power converter 400 through the secondary-side auxiliary winding 116 and the primary-side auxiliary winding 112 of the power converter 400, wherein when the voltage VC generated by the variety of the secondary-side voltage VSW is greater than the reference voltage, the primary controller 114 can generate the primary-side gate control signal PGCS to the power switch 104 accordingly, resulting in the primary side PRI of the power converter 400 being turned on. However, in another embodiment of the present invention, when the slope of the voltage VC generated by the variety of the secondary-side voltage VSW is greater than the reference value, the primary controller 114 can generate the primary-side gate control signal PGCS to the power switch 104 accordingly, resulting in the primary side PRI of the power converter 400 being turned on. In addition, subsequent operational principles of the power converter 400 are the same as those of the power converter 100, so further description thereof is omitted for simplicity.

Figure 5:
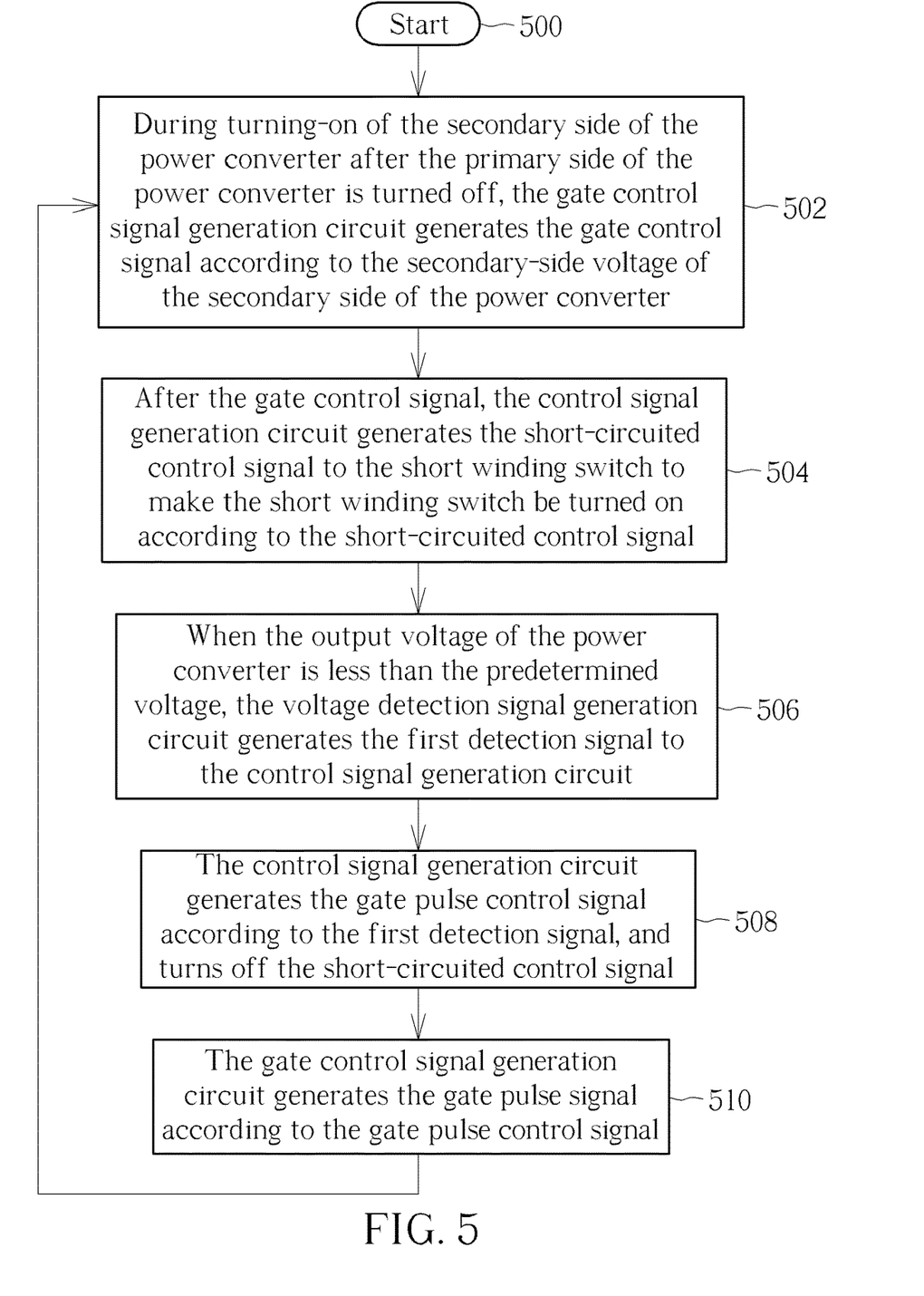
FIG. 5 is a flowchart illustrating an operation method of a secondary controller applied to a secondary side of a power converter according to a fourth embodiment.

Please refer to FIGS. 1-5. FIG. 5 is a flowchart illustrating an operation method of a secondary controller applied to a secondary side of a power converter according to a fourth embodiment. The operation method in FIG. 5 is illustrated using the power converter 100, the secondary controller 200, and the primary controller 114 in FIG. 1. Detailed steps are as follows:

Step 500: Start.

Step 502: During turning-on of the secondary side SEC of the power converter 100 after the primary side PRI of the power converter 100 is turned off, the gate control signal generation circuit 206 generates the gate control signal GCS according to the secondary-side voltage VSW of the secondary side SEC of the power converter 100.

Step 504: After the gate control signal GCS, the control signal generation circuit 202 generates the short-circuited control signal SCS to the short winding switch 106 to make the short winding switch 106 be turned on according to the short-circuited control signal SCS.

Step 506: When the output voltage VOUT of the power converter 100 is less than the predetermined voltage, the voltage detection signal generation circuit 204 generates the first detection signal FDS to the control signal generation circuit 202.

Step 508: The control signal generation circuit 202 generates the gate pulse control signal GPCS according to the first detection signal FDS, and turns off the short-circuited control signal SCS.

Step 510: The gate control signal generation circuit 206 generates the gate pulse signal GPS according to the gate pulse control signal GPCS, wherein the gate pulse signal GPS is used for making the primary side PRI of the power converter 100 be turned on, go to Step 202.

In Step 502, as shown in FIG. 2, after the primary side PRI of the power converter 100 is turned on, the primary controller 114 can determine whether to turn off the primary side PRI of the power converter 100 according to the detection voltage VD, wherein the secondary-side voltage VSW of the secondary side SEC of the power converter 100 is changed with turning-on of the primary side PRI of the power converter 100 during the time interval TP1. As shown in FIG. 2, after the time interval TP1 (that is, turning-on of the secondary side SEC of the power converter 100), the gate control signal generation circuit 206 can generate the gate control signal GCS according to the secondary-side voltage VSW between the time T1 and the time T2, wherein between the time T1 and the time T2 (that is, the enabling time of the gate control signal GCS), the synchronous switch 102 can be turned on according to the gate control signal GCS, and the enabling time of the gate control signal GCS corresponds to the discharge time of the secondary side SEC of the power converter 100.

In Step 504, after the gate control signal GCS, the control signal generation circuit 202 can know that the gate control signal GCS is completed through the gate control signal generation circuit 206, so the control signal generation circuit 202 generates the short-circuited control signal SCS to the short winding switch 106 at the time T3 to make the short winding switch 106 be turned on according to the short-circuited control signal SCS, wherein the short winding switch 106 is coupled to the secondary-side winding 108 (as shown in FIG. 1) of the power converter 100, or coupled to the secondary-side auxiliary winding 116 (as shown in FIG. 4) of the power converter 400. In addition, the predetermined time exists between the gate control signal GCS and the short-circuited control signal SCS, and the predetermined time is changed with the requirement of the designer of the power converter 100. Therefore, as shown in FIG. 2, after the short winding switch 106 is turned on, the secondary-side voltage VSW does not have resonances to ensure that the primary side PRI of the power converter 100 is turned off.

In Step 506, as shown in FIGS. 1, 2, at the time T4, because the output voltage VOUT of the power converter 100 is less than the predetermined voltage (that is, the load coupled to the secondary side SEC of the power converter 100 is suddenly heavier), the voltage detection signal generation circuit 204 will generate the first detection signal FDS to the control signal generation circuit 202. In Step 508, the control signal generation circuit 202 can generate the gate pulse control signal GPCS (shown in FIG. 1) to the gate control signal generation circuit 206 according to the first detection signal FDS, and also turns off the short-circuited control signal SCS according to the first detection signal FDS.

In Step 510, the gate control signal generation circuit 206 can generate the gate pulse signal GPS according to the gate pulse control signal GPCS. Therefore, the synchronous switch 102 of the secondary side SEC of the power converter 100 can be turned on according to the gate pulse signal GPS again, and during the enabling time of the gate pulse signal GPS, the variety of the secondary-side voltage VSW due to turning-on of the synchronous switch 102 is coupled to the primary side PRI of the power converter 100 through the primary-side auxiliary winding 112 and the secondary-side winding 108 of the power converter 100, wherein when the voltage VC generated by the variety of the secondary-side voltage VSW is greater than the reference voltage, the primary controller 114 can generate the primary-side gate control signal PGCS to the power switch 104 accordingly, resulting in the primary side PRI of the power converter 100 being turned on. After the primary side PRI of the power converter 100 is turned on, the primary controller 114 can determine whether to turn off the primary side PRI of the power converter 100 according to the detection voltage VD, wherein the detection voltage VD is determined by the primary-side current IPRI flowing through the primary side PRI of the power converter 100 and the resistor 115. However, in another embodiment of the present invention, when the slope of the voltage VC generated by the variety of the secondary-side voltage VSW is greater than the reference value, the primary controller 114 can generate the primary-side gate control signal PGCS to the power switch 104 accordingly, resulting in the primary side PRI of the power converter 100 being turned on.

To sum up, the secondary controller and the operation method thereof utilize the short winding switch to make the secondary-side voltage of the secondary side of the power converter not generate resonances to ensure that the primary side of the power converter is turned off, and utilize the gate pulse signal responding to the variety of the output voltage to make the primary side of the power converter be turned on. Therefore, compared to the prior art, because the secondary controller can control turning-on and turning-off of the power converter not necessarily through the feedback path formed by the optical coupler and the programmable shunt regulator, the power converter of the present invention has lower cost and faster dynamic response to the variety of the output voltage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A secondary controller applied to a secondary side of a power converter, the secondary controller comprising:
a control signal generation circuit for generating a short-circuited control signal to a short winding switch after a gate control signal to make the short winding switch be turned on according to the short-circuited control signal;
a voltage detection signal generation circuit coupled to an output terminal of the secondary side of the power converter and the control signal generation circuit for generating a first detection signal to the control signal generation circuit when an output voltage of the power converter is less than a predetermined voltage, wherein the control signal generation circuit further generates a gate pulse control signal according to the first detection signal; and
a gate control signal generation circuit coupled to the control signal generation circuit for generating a gate pulse signal according to the gate pulse control signal, wherein the gate pulse signal is used for making a primary side of the power converter be turned on.

2. The secondary controller of claim 1, wherein the power converter is a flyback power converter.

3. The secondary controller of claim 1, wherein during turning-on of the short winding switch, the primary side of the power converter is turned off.

4. The secondary controller of claim 1, wherein a synchronous switch of the secondary side of the power converter is turned on according to the gate pulse signal, and during enabling time of the gate pulse signal, variety of a secondary-side voltage of the secondary side of the power converter due to turning-on of the synchronous switch is coupled to the primary side of the power converter through a secondary-side winding and a primary-side auxiliary winding of the power converter to make the primary side of the power converter be turned on.

5. The secondary controller of claim 4, wherein a voltage generated by the variety of the secondary-side voltage is greater than a reference voltage, the primary side of the power converter is turned on.

6. The secondary controller of claim 4, wherein a slope of a voltage generated by the variety of the secondary-side voltage is greater than a reference value, the primary side of the power converter is turned on.

7. The secondary controller of claim 1, wherein during turning-on of the secondary side of the power converter, the gate control signal generation circuit further generates the gate control signal according to a secondary-side voltage of the secondary side of the power converter, and a synchronous switch of the secondary side of the power converter is turned on according to the gate pulse signal.

8. The secondary controller of claim 1, wherein a predetermined time exists between the gate control signal and the short-circuited control signal.

9. The secondary controller of claim 1, further comprising:
a current detection signal generation circuit for generating a second detection signal to the control signal generation circuit when an output current of the power converter is greater than a predetermined current, wherein the control signal generation circuit further generates the gate pulse control signal according to the second detection signal.

10. The secondary controller of claim 1, wherein the short winding switch is coupled to a secondary-side winding of the power converter.

11. The secondary controller of claim 1, wherein the short winding switch is coupled to a secondary-side auxiliary winding of the power converter.

12. The secondary controller of claim 1, wherein the control signal generation circuit further turns off the short-circuited control signal according to the first detection signal.

13. An operation method of a secondary controller applied to secondary side of a power converter, the secondary controller comprising a control signal generation circuit, a voltage detection signal generation circuit, and a gate control signal generation circuit, the operation method comprising:

the control signal generation circuit generating a short-circuited control signal to a short winding switch to make the short winding switch be turned on according to the short-circuited control signal after a gate control signal;

the voltage detection signal generation circuit generating a first detection signal to the control signal generation circuit when an output voltage of the power converter is less than a predetermined voltage;

the control signal generation circuit generating a gate pulse control signal according to the first detection signal; and the gate control signal generation circuit generating a gate pulse signal according to the gate pulse control signal, wherein the gate pulse signal is used for making a primary side of the power converter be turned on.

14. The operation method of claim 13, wherein during turning-on of the short winding switch, the primary side of the power converter is turned off.

15. The operation method of claim 13, wherein the gate pulse signal is used for making the primary side of the power converter be turned on comprises:

a synchronous switch of the secondary side of the power converter being turned on according to the gate pulse signal; and variety of a secondary-side voltage of the secondary side of the power converter due to turning-on of the synchronous switch being coupled to the primary side of the power converter through a secondary-side winding and a primary-side auxiliary winding of the power converter to make the primary side of the power converter be turned on during enabling time of the gate pulse signal.

16. The operation method of claim 15, wherein a voltage generated by the variety of the secondary-side voltage is greater than a reference voltage, the primary side of the power converter is turned on.

17. The operation method of claim 15, wherein a slope of a voltage generated by the variety of the secondary-side voltage is greater than a reference value, the primary side of the power converter is turned on.

18. The operation method of claim 13, wherein during turning-on of the secondary side of the power converter, the gate control signal generation circuit further generates the gate control signal according to a secondary-side voltage of the secondary side of the power converter, and a synchronous switch of the secondary side of the power converter is turned on according to the gate pulse signal.

19. The operation method of claim 13, wherein a predetermined time exists between the gate control signal and the short-circuited control signal.

20. The operation method of claim 13, wherein the control signal generation circuit further turns off the short-circuited control signal according to the first detection signal.

* * * * *